R. B. HAYTER.
PUNCTURE PROOF TIRE.
APPLICATION FILED JUNE 12, 1914.

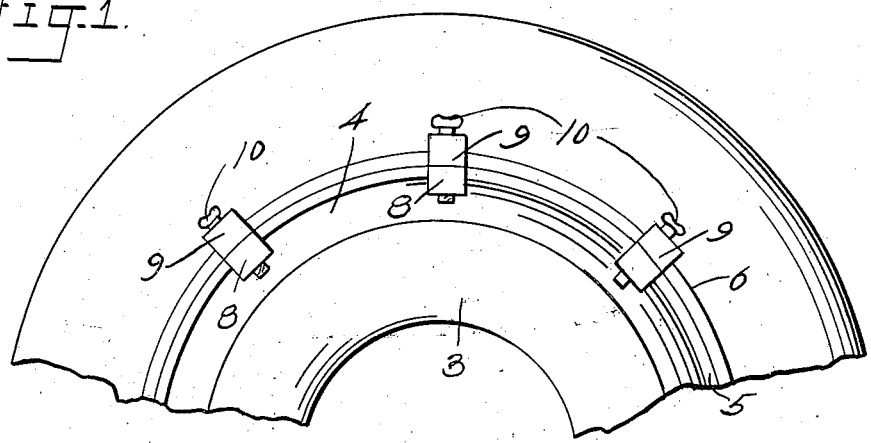
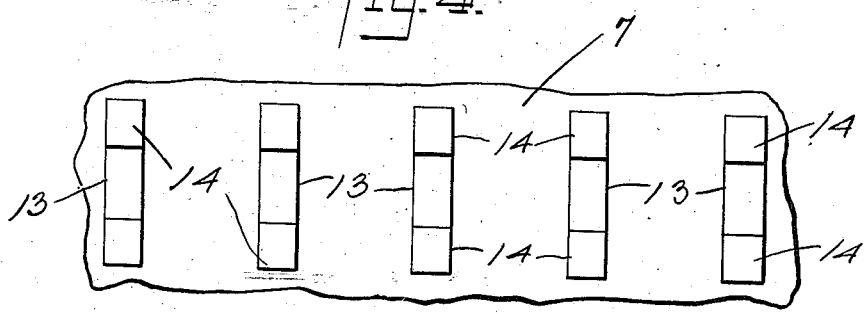
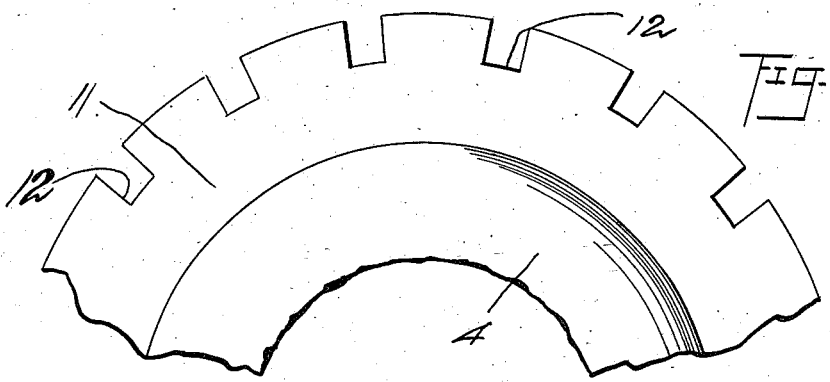

1,136,672.

Patented Apr. 20, 1915.
2 SHEETS—SHEET 2.

Witnesses

Inventor
R. B. Hayter.

By
Attorney

UNITED STATES PATENT OFFICE.

RICHARD B. HAYTER, OF LAWRENCE, KANSAS, ASSIGNOR OF ONE-HALF TO CLARENCE O. FOSTER, OF LAWRENCE, KANSAS.

PUNCTURE-PROOF TIRE.

1,136,672.   Specification of Letters Patent.   Patented Apr. 20, 1915.

Application filed June 12, 1914. Serial No. 844,736.

*To all whom it may concern:*

Be it known that I, RICHARD B. HAYTER, a citizen of the United States, residing at Lawrence, in the county of Douglas and State of Kansas, have invented certain new and useful Improvements in Puncture-Proof Tires, of which the following is a specification.

This invention comprehends certain new and useful improvements in puncture-proof tires and has for its primary object to provide a tire of this character including a pneumatic tire and protecting means positioned upon the tread portion of said pneumatic tire to prevent puncture of the same.

Another object of this invention is to provide a double puncture-proof tire which will be of simple construction and operation as well as durable and formed in such manner that independent lateral movement of the outer protecting casing or covering will be prevented.

Another object of the invention is to provide a tire of this character which will be formed in such manner that the parts thereof will interlock and may be readily secured together to prevent disengagement of the outer members from the pneumatic tire.

This invention has for a further object to provide a puncture-proof tire of this character which will be of simple construction as well as strong and durable and highly efficient in use.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 2:
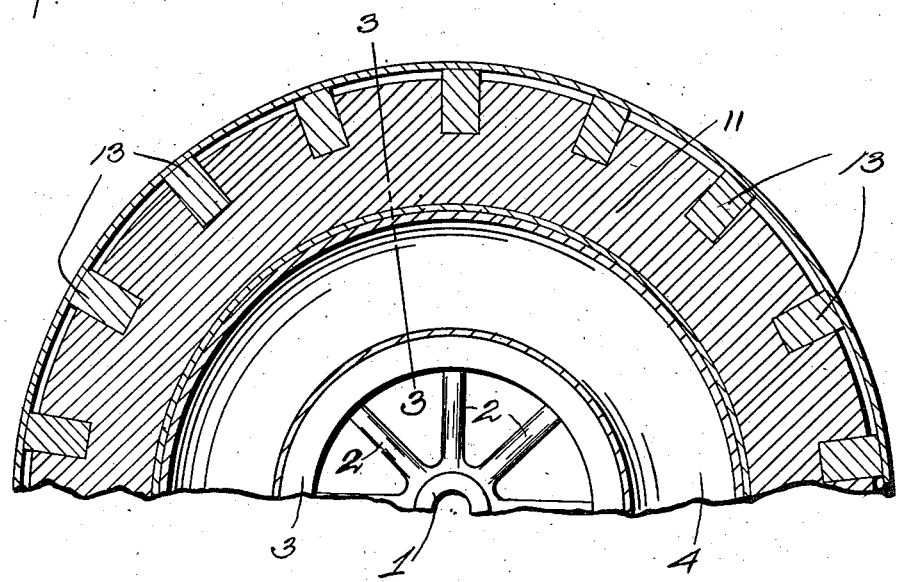
Figure 3:
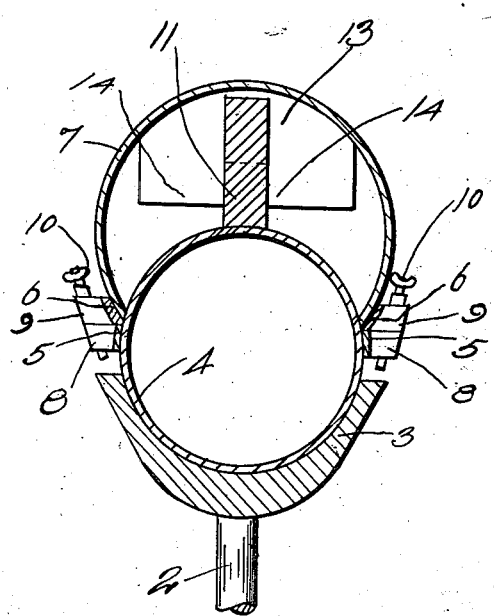

Figure 1 is a fragmentary side elevation of a puncture-proof tire constructed in accordance with my invention, Fig. 2 is a longitudinal section through the same, Fig. 3 is a transverse section on line 3—3 of Fig. 2, with the parts slightly enlarged, Fig. 4 is a fragmentary bottom plan view of the outer protecting casing or cover removed, and Fig. 5 is a fragmentary side elevation of the pneumatic tire and annular flange carried thereby.

Referring in detail to the drawings by numerals, 1 designates a hub, 2 the spokes, and 3 the felly of a wheel with which my improved puncture-proof tire may be employed, the pneumatic tire 4 being positioned in the felly 3 and having spaced continuous flanges 5 around its opposite outer edges to receive the continuous side flanges 6 formed at the lower edges of the outer or protecting casing 7 and upon the outer face of the same, as will be readily understood by referring to the drawings. The flanges 5 are provided at spaced distances with outwardly directed ears 8 which register with the corresponding outwardly directed ears 9 carried by the flanges 6, and said ears 8 and 9 are provided with threaded apertures through which the set screws 10 are engaged to securely fasten the outer protecting cover 7 upon the pneumatic tire 4.

The pneumatic tire 4 has an annular flange 11 mounted upon its tread portion and provided at spaced distances with notches 12 in its outer edge within which are engaged the transverse spaced cushion blocks 13 which have extended end portions 14 which are engaged upon opposite sides of said annular flange 11 when said blocks 13 are in position in the notches 12, thereby preventing independent lateral movement of the outer protecting casing or cover 7, as well as making it impossible for said outer cover or casing 7 to move longitudinally upon the flange 11. It will further be seen that the flange 11 and cushion blocks 13 serve to space the main portion of said outer protecting casing or cover 7 from the pneumatic tire 4 and form cushioning members, thereby lending more resiliency to the tire. It will also be readily understood that the outer portion of the casing or cover 7 forms the tread of the device, and the blocks 13 and flange 11 will prevent any sharp pointed article from reaching the pneumatic tire 4 and thereby puncturing the same.

From the foregoing it will be readily seen that I have provided a puncture-proof tire which will be of extremely simple construction and cheap to manufacture as well as highly efficient and resilient in use.

It will be understood that the protector 7 is flexible so that it yields locally.

While the preferred embodiment of my invention has been shown, it will be understood that minor changes in the details of construction, and arrangement of parts may be made within the scope of the appended claims without departing from the spirit of my invention or sacrificing any of the advantages thereof.

What is claimed is:—

1. A device of the class described comprising a pneumatic tire, a pair of strips secured longitudinally to the opposite sides thereof and upon the outer face of the tire, oppositely directed ears projecting from said strips, an outer protecting casing resting upon said tire and having strips secured to its lower longitudinal edges and resting upon the first mentioned strips, ears directed outwardly from the second mentioned strips and resting upon the first mentioned ears, means secured through the first mentioned and second mentioned ears to secure the casing in proper position and prevent the same from creeping upon the tire, and spacing and cushioning means positioned between the tire and the central portion of the casing.

2. A device of the class described comprising the combination with a tire; of strips secured to the outer face thereof at its opposite sides, ears projecting outwardly from said strips at spaced distances, a casing positioned upon the central portion of the tire, strips carried by said casing and resting upon the first mentioned strips, ears projecting outwardly from the second mentioned strips and resting upon the first mentioned ears, said first and second mentioned ears being provided with registering openings, means threaded in said registering openings to secure the casing in position, said casing being formed of flexible material to yield locally, and cushioning and reinforcing members carried by the tire and casing and interlocked with one another and serving to space the main portion of the casing from the tire.

In testimony whereof I affix my signature in presence of two witnesses.

RICHARD B. HAYTER.

Witnesses:
LEWIS H. WALLACE,
R. W. WHITE.